US008829745B2

(12) United States Patent
Le Besnerais et al.

(10) Patent No.: US 8,829,745 B2
(45) Date of Patent: Sep. 9, 2014

(54) WELDED MANIFOLD FOR A STATOR SYSTEM

(75) Inventors: Jean Le Besnerais, Mons en Baroeul (FR); Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 216 days.

(21) Appl. No.: 13/282,807

(22) Filed: Oct. 27, 2011

(65) Prior Publication Data

US 2012/0112572 A1   May 10, 2012

(30) Foreign Application Priority Data

Nov. 4, 2010  (EP) .................................... 10189982

(51) Int. Cl.
 *H02K 1/20* (2006.01)
 *H02K 9/19* (2006.01)
 *H02K 7/18* (2006.01)
(52) U.S. Cl.
 CPC ............... *H02K 9/19* (2013.01); *Y02E 10/725* (2013.01); *H02K 7/1838* (2013.01); *H02K 7/183* (2013.01)
 USPC ........................................................ 310/60 A
(58) Field of Classification Search
 USPC ................................................. 310/52–60 R
 IPC ....................................................... H02K 1/20
 See application file for complete search history.

(56) References Cited

U.S. PATENT DOCUMENTS

| | | | | |
|---|---|---|---|---|
| 2,862,121 A | * | 11/1958 | Ringland | 310/57 |
| 4,745,314 A | * | 5/1988 | Nakano | 310/57 |
| 5,886,433 A | * | 3/1999 | Oda et al. | 310/59 |
| 7,462,964 B2 | * | 12/2008 | Nagayama et al. | 310/58 |
| 2003/0222519 A1 | * | 12/2003 | Bostwick | 310/58 |
| 2009/0256433 A1 | * | 10/2009 | Stiesdal | 310/54 |

FOREIGN PATENT DOCUMENTS

| | | | |
|---|---|---|---|
| CH | 648440 | * | 3/1985 |
| DE | 2515340 A1 | | 9/1976 |
| DE | 102008063783 A1 | | 6/2010 |
| EP | 1168571 A2 | | 1/2002 |
| EP | 1499001 A1 | | 1/2005 |
| JP | 51010502 U | | 1/1976 |
| JP | 56068242 | * | 6/1981 |
| JP | 56068242 A | | 6/1981 |
| WO | WO 2007090803 A1 | | 8/2007 |

OTHER PUBLICATIONS

Machine translation of CH 648440, Obrist et al, Method for cooling an electrical machine having salient poles, Mar. 1985.*
Machine translation of JPS 51010502, Yoshiji et al, Liquid-cooled motor cooling apparatus, Jul. 1974, JPO.*

* cited by examiner

*Primary Examiner* — Dang Le

(57) ABSTRACT

A stator system for an electric machine, in particular a generator of a wind turbine is disclosed. The stator system includes a stator segment, a plate, supply system and a manifold segment. The stator segment includes a cooling channel which includes an opening at an axial front face of the stator segment. The plate is mounted to the axial front face for reinforcing the stator segment. The supply system is adapted for supplying cooling fluid to the cooling channel. The manifold segment is welded to the plate for forming a guide channel for the cooling fluid between the manifold segment and the plate. The plate includes a through-hole for generating a connection between the opening of the cooling channel and the guide channel. The supply system is connected to the guide channel.

13 Claims, 4 Drawing Sheets

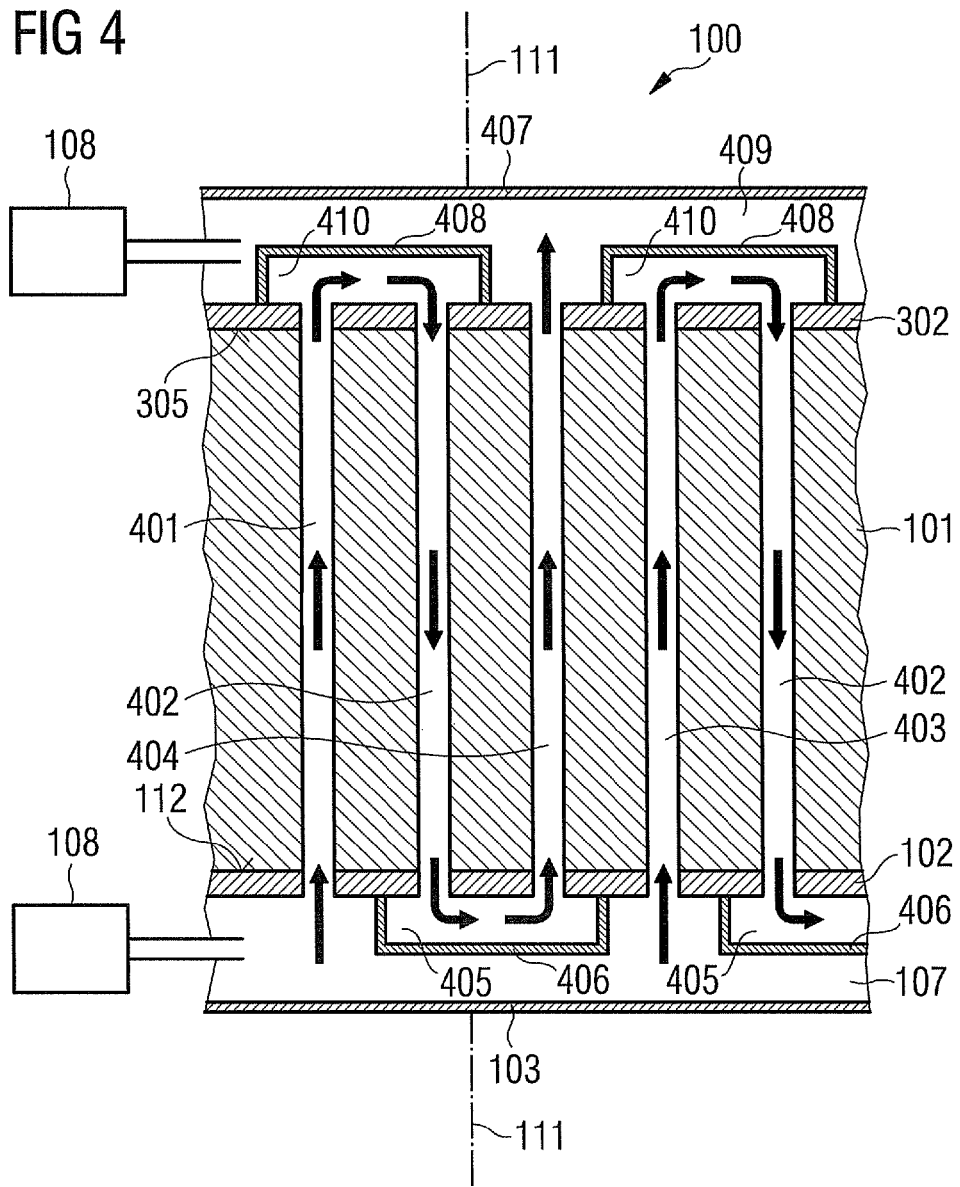

WELDED MANIFOLD FOR A STATOR SYSTEM

CROSS REFERENCE TO RELATED APPLICATIONS

This application claims priority of European Patent Office application No. 10189982.1 EP filed Nov. 4, 2010, which is incorporated by reference herein in its entirety.

FIELD OF INVENTION

The present invention relates to a stator system for an electric machine, in particular a generator for a wind turbine. Moreover, the present invention relates to a method for manufacturing a stator electric machine, in particular a generator of a wind turbine.

ART BACKGROUND

In electric machines, such as in generators for wind turbines, heat is generated when transferring mechanical energy in electrical energy and vice versa. The heat is generated in the copper conductors that form the windings of the stator by Joule losses. The generated heat has to be removed in order to avoid hotspots and insulation wearing.

The stator core and the attached windings are generally cooled by blowing air inside the stator. In axial end sections of the stator core the windings protrude and from a half loop. The protruding half loops of the windings from the end windings of the stator windings. The stator windings are cooled by blowing air through the windings, for example in an air gap between rotor and stator or through radial extending ducts of the stator core. It is also known to attach cooling pipes or hollow copper strains to the stator core in order to provide a liquid cooling. The conductor sections of the windings that are attached to the stator core are thereby cooled.

At a front face of the stator, a pressure plate for reinforcing and in particular tightening a stator lamination of the stator core is attached. Additionally, a connection for cooling fluid has to be mounted to the stator core, without affecting the tightening force of the pressure plate.

In particular, a cooling pipe for supplying cooling fluid is attached to the stator segment for transferring cooling energy to the stator windings. At the front face of the stator core, a manifold is mounted, so that the cooling fluid is supplied to or from the cooling pipe to a supply system. In conventional designs, it is complicated to combine the attachment of the pressure plate and the attachment of the manifold to the stator segment at the same time.

WO 2007/090803 A1 discloses a cooling device for an electric machine. A stator consists of a plurality of core sheets that are tightened together, so that a lamination bundle of the stator is formed. Each core sheet comprises axial channelled recesses and grooves in order to support cooling pipes and stator windings.

DE 25 15 340 A1 discloses a stator core of an electric machine in which grooves are formed for holding the windings. The stator core comprises a cooling channel.

JP 56068242 A discloses a water-cooled stator for an electric machine wherein a cooling tube made of an insulator is inserted into a cooling hole that passes through a stator core.

EP 1 168 571 A discloses a stator core with a plurality of winding slots. The windings comprise an internal conduit for circulating a coolant through the conduit.

EP 1 499 001 A1 discloses a stator core comprising an axial extending cooling channel that may be connected to an external cooling device.

SUMMARY OF THE INVENTION

It is an object of the present invention to provide an enhanced and simplified manifold connection to a stator core of an electric machine.

This object may be solved by a stator system for an electric machine, in particular a generator of a wind turbine, and by a method for manufacturing a stator system for an electric machine in particular a generator of a wind turbine.

According to a first aspect of the present invention a stator system for an electric machine, in particular a generator of a wind turbine, is presented. The stator system comprises a stator segment with a cooling channel which comprises an opening at the axial front face of the stator segment. Moreover, the stator system comprises a plate which is mounted to the axial front face to reinforce (e.g. tighten) the stator core. Furthermore, the stator system comprises a supply system for supplying cooling fluid to the cooling channel. Furthermore, the stator system comprises a manifold segment which is welded to the plate for forming a guide channel for the cooling fluid between the manifold segment and the plate. The plate comprises a through-hole for generating a connection between the opening of the cooling channel and the guide channel. The supply system is connected to the guide channel.

According to a further aspect of the present invention, a method for manufacturing a stator system for an electric machine, in particular a generator of a wind turbine, is presented. A stator segment with a cooling channel which comprises an opening at an axial front face of the stator segment is formed. A plate is mounted to the axial front face for reinforcing, i.e. tightening, the stator segment. A manifold segment is welded to the plate for forming a guide channel for the cooling fluid between the manifold segment and the plate. The plate comprises a through-hole for generating a connection between the opening of the cooling channel and the guide channel. A supply system for supplying cooling fluid is connected to the guide channel. A manifold generates a guide channel for generating a cooling fluid connection between the cooling channel of the stator segment and the supply system. The manifold may consist of a plurality of manifold segments which are attached to the plate for forming the guide channel between the plate and the surfaces of the manifold segments. To the guide channel, a supply pipe or other supply connections to the supply system are connectable.

The stator segment forms an individual segment or a complete housing of a stator of a generator. If the housing segment is a segment of the stator core, a plurality of housing segments are attachable to one another in order to form the stator core, i.e. the stator stack. The housing segments of the stator extend around a shaft of a rotor of the electric machine. Hence, the housing segments may comprise a circular, curved extension in circumferential direction around the shaft. Moreover, the housing segments comprise a longitudinal direction, wherein the longitudinal direction is substantially parallel to the axial direction of the shaft. The housing segment may comprise a plurality of sheet elements which are fixed together along the axial direction such that a stator lamination is formed. The stator lamination forms the housing segment. The sheets are electrically isolated between each other in order to prevent eddy current. The stator segment further comprises an inner surface and an outer surface, wherein the inner surface is located closer to the shaft in radial direction than the outer surface.

The stator segment comprises at its edges in axial direction with respect to the shaft axial front faces. To the axial front faces a respective plate (also called pressure plate or finger plate) is mounted. The plate mounted to the axial front face and a further plate mounted to a further axial front face located at an opposed end of the stator segment in axial direction, are connected by a beam. Hence, both plates may be tightened together along the axial direction such that the plates clamp together the stator segment, i.e. the sheets of the stator segment. In other words, the plates reinforce and tighten the stator segment.

A winding of the stator is in general attached to the inner or the outer surface of the stator segment. For example, the windings may be attached to slots which are formed in the inner or outer surface, wherein the slots have a run generally along the axial direction of the shaft.

The supply system may comprise external devices of the electric machine, such as a cooling fluid pump and/or a cooling fluid reservoir. Moreover, the supply system comprises supply channels or supply pipes that supply the cooling fluid to or from the stator segment. The supply channels may be attached separately to the plate or may be integrally formed in the stator segment. In other words, the stator segment may comprise an integral supply channel that guides the cooling fluid between the manifold segment and the supply system.

According to the present invention, the manifold segment is welded to the plate for forming the guide channel. By welding the manifold segment to the plate, a variety of favoured designs of the manifold segment and thus of the guide channel may be designed. Moreover, by welding the manifold segment to the plate, a high leak tightness between the guide channel and the environment is achieved. Moreover, when welding the manifold segment to the plate, the plate and the manifold segments may be preassembled before the plate is mounted to the stator segment. Hence, a more economic and faster manufacturing process may be achieved.

According to a further exemplary embodiment, the stator system further comprises a cooling pipe which is inserted in the cooling channel and a through-hole of the plate. The cooling channel of the stator segment may be formed simply by a groove or a through-hole inside the stator segment. Alternatively, according to the present exemplary embodiment, a separate cooling pipe may be inserted into the cooling channel. For example, the cooling pipe may be made of plastic materials or other materials that provide a beneficial streaming characteristics and manufacturing characteristics. The cooling pipe may be fixed to the cooling channel by interposing a resin layer between the cooling pipe and the cooling channel, for example. Hence, the connection between the cooling pipe and the stator segment may be improved.

Moreover, the cooling pipe may extend through the plate inside the guide channel, so that for example between the plate and the stator segment no further sealing means have to be interposed for providing a leak tightness.

In particular, according to a further exemplary embodiment, the cooling pipe comprises a pipe opening in the guide channel. The cooling pipe further comprises a flaring, so that at the pipe opening a sealed connection between the cooling channel and the guide channel is generated.

According to a further exemplary embodiment of the present invention, the manifold segment comprises protrusions (fins), wherein the protrusions are exposable to cooling air. The protrusions are formed at an outer surface of the manifold segment and extend in a direction to the environment of the stator system. The protrusions generate a larger surface to the environment in comparison to a simple flat surface without any protrusions. Hence, the thermal contact and thus the thermal heat transfer between the guide channel, the wall portions of the manifold segment and the cooling air of the environment is improved. Hence, by means of the protrusions, the cooling fluid flowing through the guide channel may be cooled more efficiently by cooling air streaming through the protrusions.

According to a further exemplary embodiment of the present invention, the manifold segment is an outer manifold segment and the guide channel is an outer guide channel. The stator system further comprises an inner manifold segment which is attached to the plate between the outer manifold segment and the plate such that the inner manifold segment forms an inner guide channel for the cooling fluid between the inner manifold segment and the plate. The outer guide channel for the cooling fluid is formed between the plate, the (outer surface of the) inner guide channel and the outer guide channel.

In other words, the inner manifold segment may be nested inside the outer manifold segment. Hence, between the surface of the plate and the inner surface of the inner manifold segment, the inner guide channel for guiding cooling fluid is formed, whereas between the plate, the outer surface of the inner guide segment and the (inner surface of the) outer manifold segment is formed. The cooling fluid flowing through the inner guide channel is separated from the cooling fluid flowing through the outer guide channel. Hence, the flowing directions and the volume of the cooling fluid inside the inner guide channel may differ from the cooling fluid of the outer guide channel. Hence, a more flexible circulation of cooling fluid may be achieved. The inner manifold segment and the outer manifold segment may be preassembled to the plate, so that even for complex cooling fluid circulation only one plate/manifold assembly is mounted in one working step to the stator segment. Further modifications to the stator segment are not necessary.

According to a further exemplary embodiment, the cooling channel of the stator segment is a first cooling channel. The stator segment comprises a further first cooling channel, a second cooling channel and a third cooling channel. The plate comprises through-holes for generating a) a connection between the first cooling channel and the outer guide channel and a connection between the further first cooling channel and the outer guide channel, and b) a connection between the second cooling channel and the inner guide channel and a connection between the third cooling channel and the inner guide channel.

Hence, by the exemplary embodiment, the inner manifold segment forms the inner guide channel for connecting the second cooling channel and the third cooling channel. The inner manifold segment is nested inside the outer manifold segment. The outer manifold segment generates the outer cooling channel for connecting the first cooling channel with the further first cooling channel. Hence, two separate cooling fluid circulations, one between the second cooling channels and one between the first cooling channels may be generated. Hence, a more complex and flexible circulation for the cooling fluid may be achieved.

In particular, according to a further exemplary embodiment, the second cooling channel and the third cooling channel are located to the stator segment adjacent to each other. The first cooling channel and the further first cooling channel are located to the stator segment in such a way that between the first cooling channel and the further first cooling channel the second cooling channel and the third cooling channel are located.

The cooling channels may comprise in general a substantially parallel run along the stator segment between each other. In particular, the cooling channels comprise in general a substantially parallel run with respect to the axis of the shaft of the rotor of the electric machine. The cooling channels are distributed along the stator core in a circumferential direction with respect to the shaft.

According to a further exemplary embodiment, the stator system further comprises a further plate. The stator segment comprises a further axial front face to which the further plate is mounted. A further inner manifold segment for forming a further inner guide channel and a further outer manifold segment for forming a further guide channel are attached to the further plate. The stator segment comprises a further axial front face to which the further plate is mounted. The further inner guide channel and the further outer guide channel are formed for connecting a) the first cooling channel and/or the further first cooling channel with b) the second cooling channel and/or the third cooling channel.

Hence, by the exemplary embodiment described above, the arrangement of the inner manifold and the outer manifold with respect to the further inner manifold and the further outer manifold segment are displaced by one cooling channel in circumferential direction. In other words, the outer guide channel of the outer manifold segment connects at the axial front face of the stator segment first cooling channels and further first cooling channels and the inner guide channel of the inner manifold segment connects second cooling channels and third cooling channels. At the further axial front face of the stator segment, in comparison to the axial front face of the stator segment, the further outer cooling channel connects (further) first cooling channels with a second cooling channel or a third cooling channel and the further inner guide channel of the further inner manifold segment connects another (further) first cooling channel with another second cooling channel or third cooling channel. Hence, in circumferential direction (i.e. along the width) of the stator segment, a cooling fluid flow along the circumferentially disposed cooling channels may be generated, wherein cooling channels generates for the cooling fluid flow a meander course along the stator segment.

According to a further exemplary embodiment, the supply system comprises a supply pipe which is connected to the outer guide channel for supplying cooling fluid to or from the outer guide channel. Moreover, a further supply pipe may be connected to the further guide channel for supplying cooling fluid to or from the outer guide channel.

According to a further exemplary embodiment, the supply pipe is integrally formed within the stator segment. The supply pipe may be formed by a bore hole inside the stator segment, so that an integral interface of the stator segment to the supply system may be achieved.

By the present invention, a common manifold for the cooling channels is welded to the plate. Additionally, a common second manifold segment for the (second) cooling channels is attached (e.g. welded) to the plate as well. Hence, no further items and parts have to be mounted to the plate. Between the plate and the front face of the stator segment resin may be interposed for achieving leak tightness between the stator segment and the plate. Hence, no welding between the plate and the stator segment is needed.

The plate may further comprise a supply connection, i.e. a main inlet/outlet connection hole, wherein the main inlet/outlet connection hole generates a connection between the guide channel (i.e. the outer guide channel) and the supply system. In particular, the supply pipe of the supply system may be attached to the same surface side of the plate as the cooling channels are attached to the plate. Hence, the supply pipe does not need to be attached at the opposed side of the plate in axial direction, so that an easier design is achievable.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

FIG. 4 shows a schematic view of a stator system with an inner manifold and an outer manifold according to an exemplary embodiment of the present invention.

DETAILED DESCRIPTION

Figure 1:
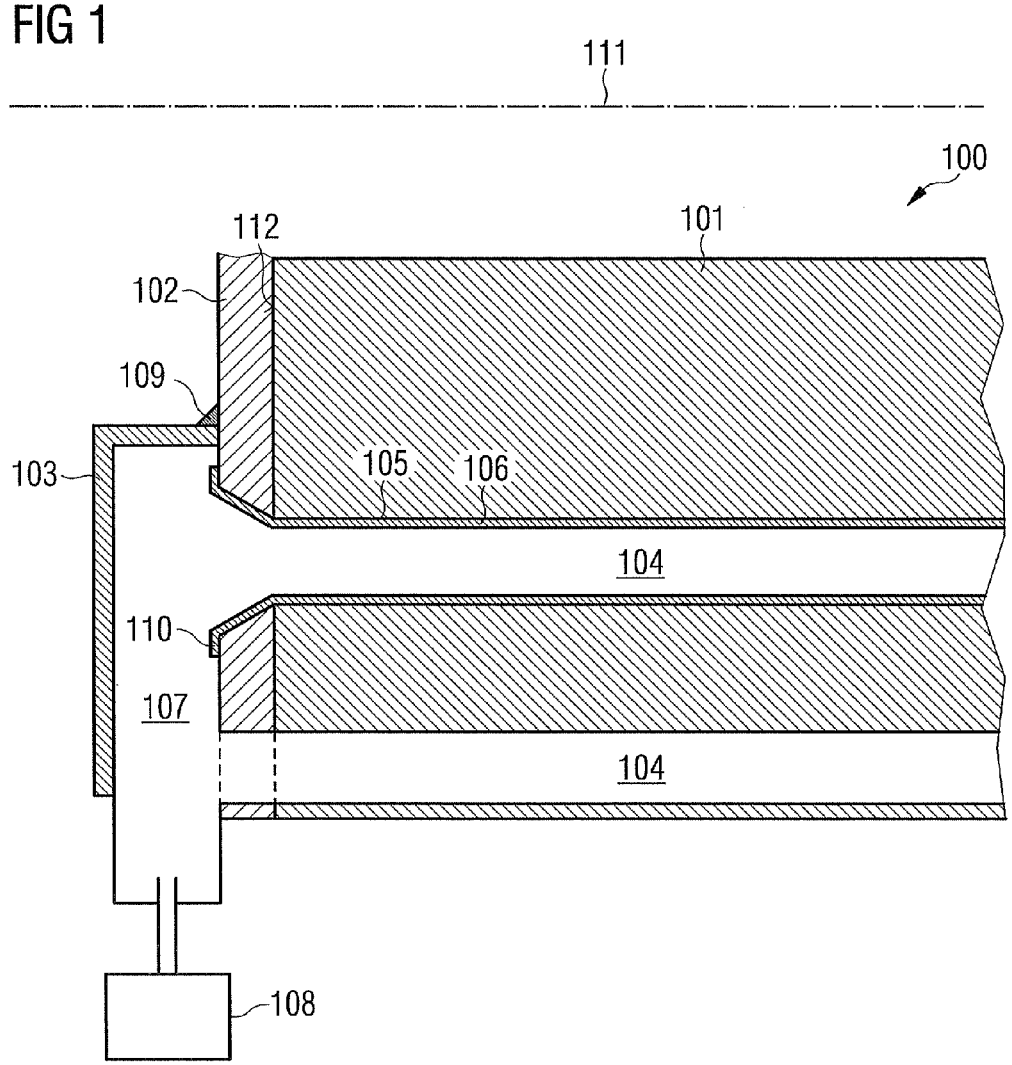
FIG. 1 shows a schematic view of a stator system according to an exemplary embodiment of the present invention.

The illustrations in the drawings are schematical. It is noted that in different figures, similar or identical elements are provided with the same reference signs.

FIG. 1 shows a stator system 100 for an electric machine, in particular a generator of a wind turbine. The stator system 100 comprises a stator segment 101, a plate 102, a supply system 108 and a manifold segment 103. The stator segment 101 comprises a cooling channel 104 which comprises an opening at an axial front face 112 of the stator segment 101. The plate 102 is mounted to the axial front face 112 for tightening the stator segment 101. The supply system 108 is adapted for supplying cooling fluid to the cooling channel 104. The manifold segment 103 is welded to the plate 102 for forming a guide channel 107 for the cooling fluid between the manifold segment 103 and the plate 102. The plate 102 comprises a through-hole for generating a connection between the opening of the cooling channel 104 and the guide channel 107. The supply system 108 is connected to the guide channel 107.

As shown in FIG. 1, cooling channels 104 are attached to the stator segment 101. The cooling channels 104 run in general parallel to each other and e.g. parallel to a shaft 111 of a rotor of the electric machine. The stator segment 101 comprises the axial front face 112 defined at an end in axial direction with respect to the shaft 111. To the axial front face 112 the plate 102 is mounted. The plate 102 comprises respective through-holes for connecting the cooling channels 104 to the guide channel 107 of the manifold segment 103. The manifold segment 103 is welded to the plate 102. FIG. 1 illustrates welded spots 109 to highlight the welding connections. The manifold segment 103 is welded to a surface of the plate 102 that is located on an opposed side with respect to a side of the plate 102 that is attached to the axial front face 112 of the stator segment 101.

The guide channel 107 formed by the manifold segment 103 and the plate 102 generates a connection between the supply system 108 and the cooling channels 104. Therefore, the plate 102 may comprise a plurality of respective through-holes that are assigned to the cooling channels 104 for providing a fluid connection between the cooling channels 104 and the guide channel 107. To the guide channel 107, a connection to the supply system 108 is formed.

Moreover, as can be taken from FIG. 1, inside the cooling channels 104, cooling pipes 106, e.g. made of plastic materials, may be inserted. The cooling pipes 106 may extend through the plate 102 inside the guide channel 107. In an opening section of the cooling pipe 106 inside the guide channel 107, the cooling pipe 106 may comprise a flaring 110 in order to improve the leak tightness. Hence, by applying cooling pipes 106 extending into the guide channel 107, it may be sufficient to glue the plate 102 to the stator segment 101 by resin, so that a sufficient physical connection and leak tightness is achieved. Moreover, the cooling pipes 106 do not need to be welded to the plate 102, so that a material with a high thermal expansion in comparison to the stator segment 101 may be used.

Between the cooling pipes 106 and the cooling channels 104 a resin layer 105 may be interposed in order to fix the cooling pipe 106 into a respective cooling channel 104.

The supply system 108 is adapted for feeding the guide channel 107 with cooling fluid or for draining cooling fluid from the guide channel 107.

Figure 2:
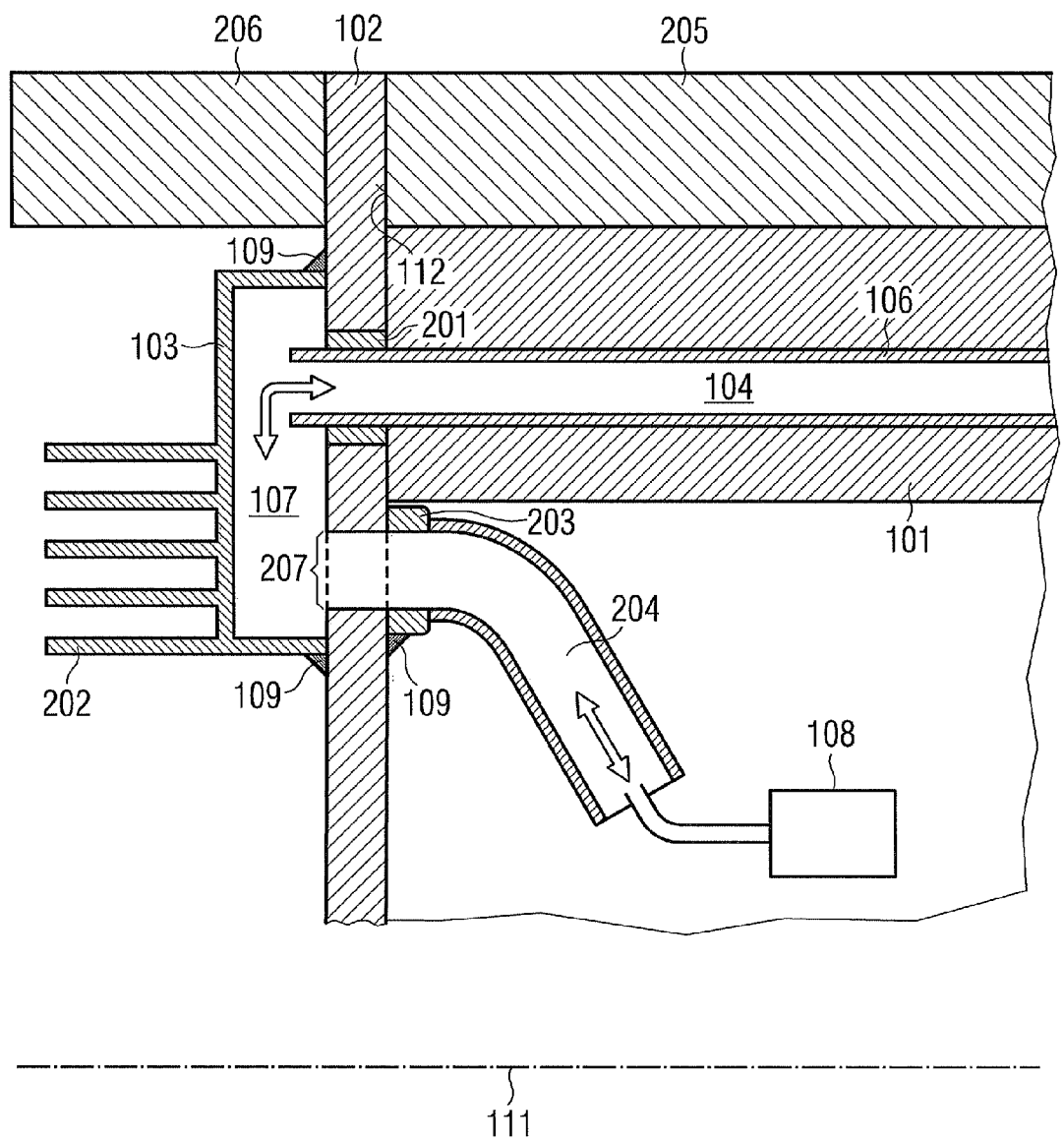
FIG. 2 illustrates a schematic view of a stator segment with a manifold comprising protrusions according to an exemplary embodiment of the present invention.

FIG. 2 shows in more detail an exemplary embodiment of the stator system 100 according to the present invention. To an outer surface of the stator segment 101 stator windings 205 are attached. Therefore, the stator segment 101 may comprise slots that run in general parallel to the shaft 111 into which the stator winding 205 may be inserted. The windings 205 may run along a loop when leaving the stator segment 101. This section of the end windings 205 that run along a loop outside of the stator segment 101 may be called end winding 206.

Moreover, between the cooling pipe 106 and the through-hole of the plate 102 a sealing 201 may be interposed in order to improve the leak tightness.

As shown in FIG. 2, the manifold segment 103 comprises protrusions 202 (fins) that extend for example in axial direction from a surface of the manifold segment 103 to the environment of the stator system 100. Hence, the protrusions 202 may be exposed to surrounding air of the stator system 100, so that an improved cooling efficiency may be achieved.

Moreover, the plate 102 further comprises a further through-hole that may act as a supply connection 207 for connecting the supply system 108 to the guide channel 107.

The plate 102 comprises a first surface with which the plate 102 is attached to the stator segment 101. Furthermore, the plate 102 comprises a second surface (opposed to the first surface), to which the manifold segment 103 is welded. The supply connection 207 is formed at the first surface. Hence, the connections of the cooling channel 104 to the plate and the supply connection 207 of the supply pipe 204 are located at the same (first) surface. Hence, the supply connection 207 is serviceable easier and the design of the stator system 100 is more compact. The supply connection 207 is preferably arranged in such a way that the cooling pipe 204 run along the outer surface of the housing segment 101.

To the guide channel 107 one or a plurality of supply pipes 204 may be connected. At the (second) opposite side of the plate 102 only the manifold segment 103 is welded. Hence, the supply pipe 204 does not need to run along the second (outer) side of the plate 102.

Hence, the supply connection 207 may comprise a serviceable connection 203, so that an exchangeable connection with the supply pipe 204 is generatable. The serviceable connection 203 may be for example a ring connection that is welded to the first side of the plate 102, as indicated by the welded spot 109. Moreover, by the serviceable connection 207, it is possible to connect for example a plastic supply pipe 204 to the plate 102 made of steel. In other words, by the supply connection 207, a steel to plastic connection is generatable. Moreover, the serviceable connection 203 is adapted for providing a removable connection between the supply pipe 204 and the plate 102.

Figure 3:
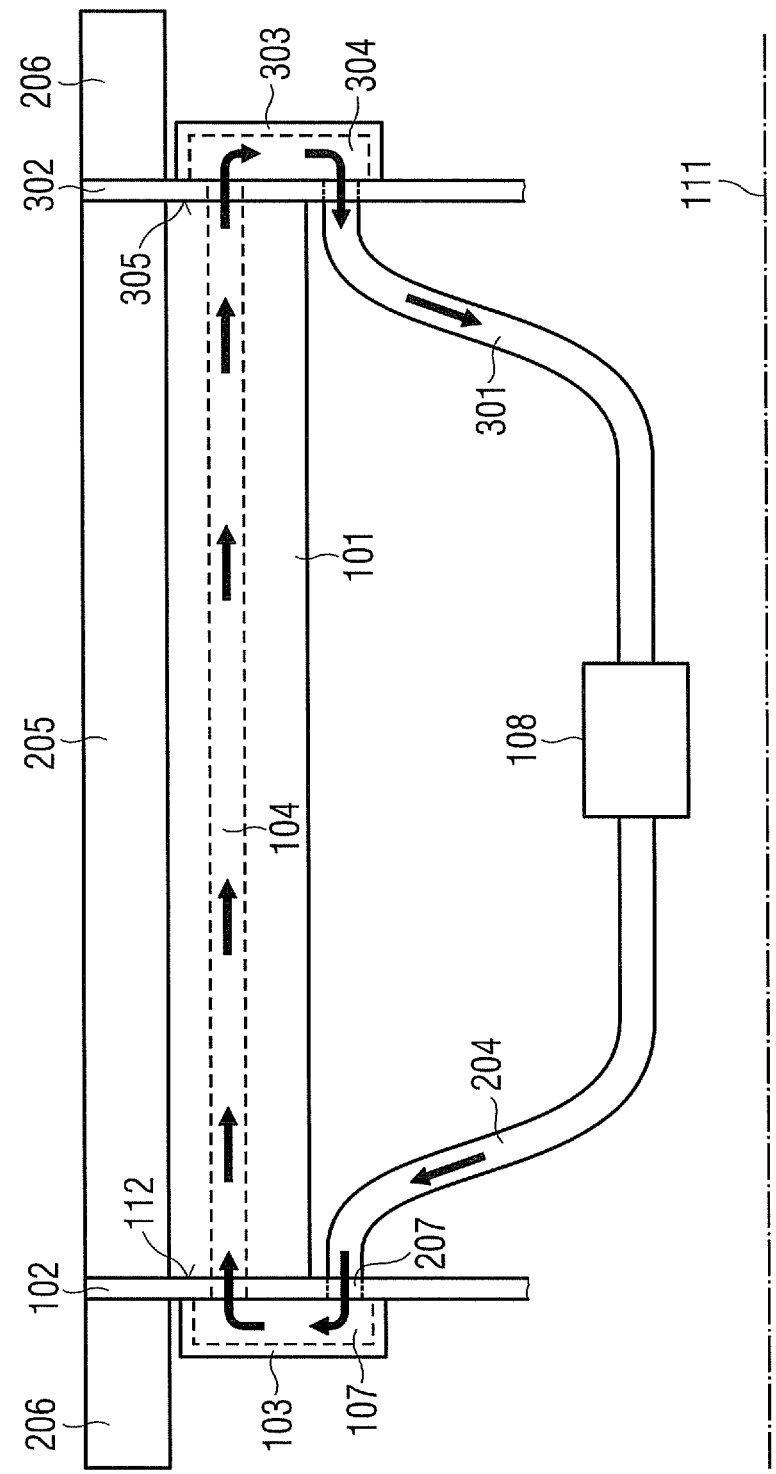
FIG. 3 illustrates a schematic view of a stator system with a plate and a further plate according to an exemplary embodiment of the present invention.

FIG. 3 shows a further exemplary embodiment of the stator system 100 wherein at opposed axial front faces 112, 305 of the stator segment 101 plates 102, 302 are attached.

At the left axial front face 112 of the stator segment 101 the plate 102, to which the manifold 103 is welded, is attached. The manifold segment 103 forms the guide channel 107. The supply connection 207, formed by a through-hole through the plate 102, generates a connection between the supply pipe 204 and the guide channel 107. The exemplary embodiment shown in FIG. 3, the supply pipe 204 fed cooling fluid into the guide channel 107 and thus into the cooling channel 104. The cooling fluid flowing through the cooling channel 104 cools the stator winding 205. The end windings 206 may be cooled by the surrounding cooling air.

On the right side of the stator segment 101 shown in FIG. 3, a further plate 302 is attached to a further axial front face 305 of the stator segment 101. To the further plate 302 a further manifold 303 is attached for forming a further guide channel 304. The further plate 302 comprises a further through-hole for connecting a further supply pipe 301 with the further guiding channel 304. As shown in FIG. 3, the cooling fluid flows from the cooling channel 104 to the further guide channel 304 and further to the further supply pipe 301. Hence, the further supply pipe 301 drains the cooling fluid from the further guide channel 304 to the supply system 108. The supply system 108 may cool down the cooling fluid for example and pump the cooled cooling fluid through the supply pipe 204 to the guide channel 107. Hence, a cooling circulation is generated.

FIG. 4 shows a further exemplary embodiment of the present invention, wherein a run of a cooling fluid in a meander-like shape along the width of stator segment 101 in circumferential direction around the shaft 111 is shown. The stator segment 101 comprises a first cooling channel 401, a second cooling channel 402, a further first cooling channel 403 and a third cooling channel 404. Each of the cooling channel 401, 402, 403, 404 forms a fluid connection between the plate 102 and the further plate 302 and runs along a substantial parallel direction with respect to the axial direction of the shaft 111. To the plate 102 the manifold segment 103, which is an outer manifold segment 103 in the exemplary embodiment of FIG. 4, is welded. Moreover, an inner manifold segment 406 is mounted (e.g. welded) to the plate 102. The outer manifold segment 103 surrounds and nests the inner manifold segment 406. Hence, the outer manifold segment 103 forms the outer guide channel 107 between the plate 102, a surface of the inner manifold segment 406 and the manifold segment 103. The inner manifold segment 406 forms an inner guide channel 405 that is formed between the inner manifold segment 406 and the plate 102.

As shown in FIG. 4, the inner guide channel 405 connects to adjacent cooling channels, namely the second cooling channel 402 and the third cooling channel 404.

The outer guide channel 107 connects the first cooling channel 401, the further first cooling channel 403 and the supply system 108.

Along a circumferential direction of the stator segment 101, the first cooling channel 401 and the further first cooling channel 403 are located with respect to each other in such a way, that between the first cooling channel 401 and the further first cooling channel 403 the second cooling channel 402 and the third cooling channel 404 are located.

Moreover, as can be taken from FIG. 4, at the opposed further axial front face 305 of the stator segment 101 with respect to the axial front face 112, the further plate 302 is attached. To the further plate 302, a further outer manifold segment 407 is attached for forming a further outer guide channel 409. Moreover, to the further plate 302 a further inner manifold segment 408 is attached for forming a further inner guide channel 410. To the further outer guide channel 409, the supply system 108 is connectable, e.g. for draining the cooling fluid.

As can be taken from FIG. 4, the further inner guide channel 410 connects the first cooling channel 401 and the second cooling channel 402. Moreover, another further inner manifold segment 408 connects the further first cooling channel 403 with another second cooling channel 402. The further outer guide channel 409 connects respectively the third cooling channel with the supply system 108.

Hence, by the arrangement shown in FIG. 4, an efficient circulation of the cooling fluid may be achieved by simple configurations of the manifold segments 103, 406, 407, 408. For example, as shown in FIG. 4, cooling fluid may be fed by the supply system 108 to the outer guide channel 107. The cooling fluid flows through the first cooling channel 401 and the further first cooling channel 403 to the further plate 302. At the further plate 302, the further inner manifold segment 408 guides the cooling fluid from the (further) first cooling channels 401, 403 to the second cooling channel 402. Within the second cooling channel 402, the cooling fluid flows from the further plate 302 to the plate 102. At the plate 102, the inner manifold segment 406 is attached for forming the inner guide channel 405, wherein the inner guide channel 405 connects the second cooling channel 402 and the third cooling channel 404, so that the cooling fluid flows again to the further plate 302. At the further plate 302, the cooling fluid flows from the third cooling channel 404 into the further outer guide channel 409 of the further outer manifold segment 407 and may be drained from the further outer guide channel 409 to the supply system 108. The supply system 108 cools the cooling fluid and fed the cooling fluid again to the outer guide channel 107 of the outer manifold segment 103. Hence, an efficient cooling circuit for the cooling fluid is achieved.

In other words, the cooling fluid crosses the stator segment 101 for example three times through three cooling channels 401, 402, 404 before being drained off through the further outer guide channel 409 to the supply system 108. Moreover it may be possible, to attach another inner manifold segment to the plate 102 in such a way, that the another inner manifold segment is nested by the inner manifold segment 406 and the outer manifold segment 103 nests the inner manifold segment 406 and the another inner manifold segment.

In another exemplary embodiment, the inner manifold segment 406 may connect more than one cooling channels 402 and the further inner manifold segment 408 attached to the further plate 302 may connect a plurality of first and second cooling channels 401, 402. Hence, the cooling fluid flows more than three times between the plate 102 and the further plate 302 before flowing through the third cooling channel 404 which feeds the cooling fluid to the further outer guide channel 409. From the further outer guide channel 409 the cooling fluid is drained off to the supply system 108.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A stator system of a generator of a wind turbine, the stator system comprising:
a stator segment which comprises a plurality of sheet elements which are fixed together along an axial direction such that a stator lamination is formed, the stator segment comprises a plurality of parallel cooling channels which each comprises an opening at an axial front face of the stator segment;
a plate mounted to the axial front face is configured to apply pressure to the stator segment stator lamination in order to tighten the stator lamination;
a supply system is configured to supply cooling fluid to the plurality of parallel cooling channels;
an outer-manifold segment welded to the plate is configured to form an outer-guide channel for maintaining the cooling fluid between the outer-manifold segment and the plate; and
an inner manifold segment which is attached to the plate between the outer-manifold segment and the plate such the inner-manifold forms an inner guide channel for maintaining the cooling fluid between the inner-manifold segment and the plate,
wherein the plate comprises a through-hole for each of the plurality of parallel cooling channels for generating a connection between the opening of the respective cooling channel and one of the guide channels, and
wherein the supply system is connected to the outer-guide channel in order to supply the cooling fluid into the outer-guide channel.

2. The stator system according to claim 1,
wherein each of the plurality of parallel cooling channels includes a cooling pipe which is inserted through the respective through-hole and into the respective cooling channel.

3. The stator system according to claim 2,
wherein the cooling pipes inserted into the plurality of parallel cooling channels each comprises a flared pipe opening in one of the guide channels which generates a sealed connection between the respective cooling channel and the respective guide channel.

4. The stator system according to claim 1,
wherein the outer-manifold segment comprises at least one protrusion extending outside and away from the outer-guide channel, and
wherein the protrusion is exposable to cooling air.

5. The stator system according to claim 1,
wherein the plurality of parallel cooling channels stator segment includes a first cooling channel, a second cooling channel, a third cooling channel, and a fourth cooling channel,
wherein the outer-guide channel directs the cooling fluid into the first and fourth cooling channels in a first direction,
wherein the inner-guide channel is arranged to direct cooling fluid from the second cooling channel to the third cooling channel, wherein the direction of the cooling fluid is changed between the second and third cooling channel.

6. The stator system according to claim 5,
wherein the second cooling channel and the third cooling channel are stator segment adjacent to each other, and
wherein the second and third cooling channels are arranged between the first and fourth cooling channels' stator segment.

7. The stator system according to claim 6, further comprising:
a further plate;
a further inner manifold segment attached to the further plate for forming a further inner-guide channel; and
a further outer manifold segment attached to the further plate for forming a further outerguide channel,
wherein the stator segment comprises a further axial front face, which is opposite to the axial front face, to which the further plate is mounted, and
wherein the further inner guide channel and the further outer guide channel are formed for connecting:
a) the first cooling channel and/or the fourth cooling channel with
b) the second cooling channel and/or the third cooling channel.

8. The stator system according to claim 5,
wherein the direction of the cooling fluid in the second cooling channel is in a second and opposite direction than the first direction.

9. The stator system according to claim 5,
wherein plate extends the full length of the housing segment.

10. The stator system according to claim 5,
wherein each cooling channel is inside the stator segment from a first end of the stator segment to a second end.

11. The stator system according to claim 1,
wherein the supply system comprises a supply pipe which is connected to the outer-guide channel for supplying cooling fluid between the outer-guide channel and the supply system.

12. The stator system according to claim 1,
wherein the supply pipe is integrally formed within the stator segment.

13. A method of manufacturing a stator system of a wind turbine generator, the method comprising:
forming a stator segment which comprises a plurality of sheet elements which are fixed together along an axial direction such that a stator laminate is formed;
providing with a plurality of parallel cooling channels which each comprises an opening at an axial front face of the stator segment;
mounting a plate to the axial front face which applies a pressure to the stator laminate in order to tighten the stator lamination; and
welding an outer-manifold segment to the plate for forming an outer-guide channel for maintaining the cooling fluid between the manifold segment and the plate,
wherein the plate comprises a through-hole for each of the plurality of parallel cooling channels for generating a connection between the opening of the respective cooling channel and one of the guide channels,
connecting a supply system for supplying cooling fluid to the outer-guide channel; and
attaching an inner-manifold segment between the outer manifold segment and the plate, such that the inner manifold segment forms an inner-guide channel for the cooling fluid between the inner manifold segment and the plate.

* * * * *